United States Patent
Tran et al.

(10) Patent No.: US 9,146,802 B2
(45) Date of Patent: Sep. 29, 2015

(54) PROVIDING AN ERROR LOG TO A MOBILE DEVICE

(71) Applicants: Duong-Han Tran, Bad Schoenborn (DE); Andreas Hoffner, Wagnausel (DE); Timur Fichter, Schwetzingen (DE)

(72) Inventors: Duong-Han Tran, Bad Schoenborn (DE); Andreas Hoffner, Wagnausel (DE); Timur Fichter, Schwetzingen (DE)

(73) Assignee: SAP SE, Walldorf (DE)

( * ) Notice: Subject to any disclaimer, the term of this patent is extended or adjusted under 35 U.S.C. 154(b) by 211 days.

(21) Appl. No.: 13/928,688

(22) Filed: Jun. 27, 2013

(65) Prior Publication Data
US 2015/0006979 A1    Jan. 1, 2015

(51) Int. Cl.
*G06F 11/00* (2006.01)
*G06F 11/07* (2006.01)

(52) U.S. Cl.
CPC .................................. *G06F 11/0775* (2013.01)

(58) Field of Classification Search
None
See application file for complete search history.

(56) References Cited

U.S. PATENT DOCUMENTS

| | | | |
|---|---|---|---|
| 5,892,898 A * | 4/1999 | Fujii et al. | 714/57 |
| 7,581,105 B2 | 8/2009 | Dietl | |
| 7,849,445 B2 | 12/2010 | Tran | |
| 8,180,845 B2 | 5/2012 | Brendle et al. | |
| 8,275,742 B2 | 9/2012 | Bhatt et al. | |
| 8,306,862 B2 | 11/2012 | Weiler et al. | |
| 2010/0192132 A1* | 7/2010 | Yuan et al. | 717/128 |

OTHER PUBLICATIONS

U.S. Appl. No. 13/535,562, filed Jun. 28, 2012, Duong-Han Tran.

\* cited by examiner

*Primary Examiner* — Jason Bryan
(74) *Attorney, Agent, or Firm* — Fish & Richardson P.C.

(57) ABSTRACT

Techniques for providing an error log include establishing, by a hub computing system, a connection with a back-end computing system, the back-end computing system executing a first computer-implemented programming language; receiving, at the hub computing system, a request for an error log from an Open Data Protocol (OData) application that resides on a mobile communications device, the mobile communications device executing a second computer-implemented programming language different than the first computer-implemented programming language, and the error log including error log entries associated with a runtime processing of a data model; registering, on the hub computing system, the error log as an OData service configured to be provided over an OData channel between the hub computing system and the mobile communications device; and providing, by the hub computing system, the error log to the OData application as the OData service over the OData channel.

17 Claims, 12 Drawing Sheets

Display Service

Service Information

| | |
|---|---|
| Technical Service Name | /IWBEP/ERROR_LOG_SRV |
| Service Version | 1 |
| Description | Error Log as OData Service |
| External Service Name | ERROR_LOG_SRV |
| Namespace | /IWBEP/ |
| Data Provider Class | /IWBEP/CL_ERROR_LOG_DPC_EXT |
| Created By | SMITH |
| Changed By | SMITH |
| Package | /IWBEP/MGW_ERROR_LOG |
| XYZ Service | ✓ |

Model Information

| | |
|---|---|
| Technical Model Name | /IWBEP/ERROR_LOG_MDL |
| Model Version | 1 |
| Description | Error Log as OData Service Model |
| Model Provider Class | /IWBEP/CL_ERROR_LOG_NPC_EXT |
| Created By | SMITH |
| Changed By | |
| Package | /IWBEP/MGW_ERROR_LOG |

[ Create Vocel ] [ Unassign Model ] [ Assign Model ] [ Annotation Model ]

PROVIDING AN ERROR LOG TO A MOBILE DEVICE

TECHNICAL BACKGROUND

This disclosure relates to providing an error log to a mobile communications device and, more particularly, providing an error log as an OData service to a mobile communications device.

BACKGROUND

An error log tool is helpful in analyzing the problems during runtime processing within a system architecture (e.g., a distributed computing environment). The error provides detailed context information about errors that have occurred to a user within the system. Thus, the user can analyze such errors presented by the error log.

SUMMARY

The present disclosure relates to computer-implemented methods, software, and systems for providing an error log. In some implementations, a connection is established by a hub computing system with a back-end computing system. The back-end computing system executes a first computer-implemented programming language. A request is received at the hub computing system for an error log from an Open Data Protocol (OData) application that resides on a mobile communications device. The mobile communications device executes a second computer-implemented programming language different than the first computer-implemented programming language. The error log includes error log entries associated with a runtime processing of a data model. The error is registered on the hub computing system as an OData service configured to be provided over an OData channel between the hub computing system and the mobile communications device. The error log is provided by the hub computing system to the OData application as the OData service over the OData channel.

Other general implementations include corresponding computer systems, apparatus, and computer programs recorded on one or more computer storage devices, each configured to perform the actions of the methods. A system of one or more computers can be configured to perform operations to perform the actions. One or more computer programs can be configured to perform particular operations or actions by virtue of including instructions that, when executed by data processing apparatus, cause the apparatus to perform the actions.

In a first aspect combinable with any of the general implementations, the second computer-implemented programming language includes an iOS-based or Android-based programming language.

In a second aspect combinable with any of the previous aspects, providing the error log to the OData application includes providing the error log though a web-based graphical user interface.

A third aspect combinable with any of the previous aspects further includes authorizing the mobile communications device to receive the error log.

In a fourth aspect combinable with any of the previous aspects, providing the error log to the OData application further includes formatting the error log for display on a graphical user interface of the mobile communications device.

In a fifth aspect combinable with any of the previous aspects, registering the error log as an OData service includes generating a model provider class and a data provider class that are each associated with the error log.

In a sixth aspect combinable with any of the previous aspects, registering the error log as an OData service includes registering the model provider class and the data provider class to provide the error log as the OData service.

A seventh aspect combinable with any of the previous aspects further includes generating a data object access class, and based on the generated data object access class, providing access to an application programming interface (API) associated with the error log.

Various implementations of a computing system according to the present disclosure may have one or more of the following features. For example, such features include identification of the precise time and location of errors; determining how often an error has occurred; performing route-cause analysis; and reproduction and correction of errors.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

FIGS. 5A-5E illustrate an example graphical user interface for the implementation of the error log as an OData service;

DETAILED DESCRIPTION

Figure 1:
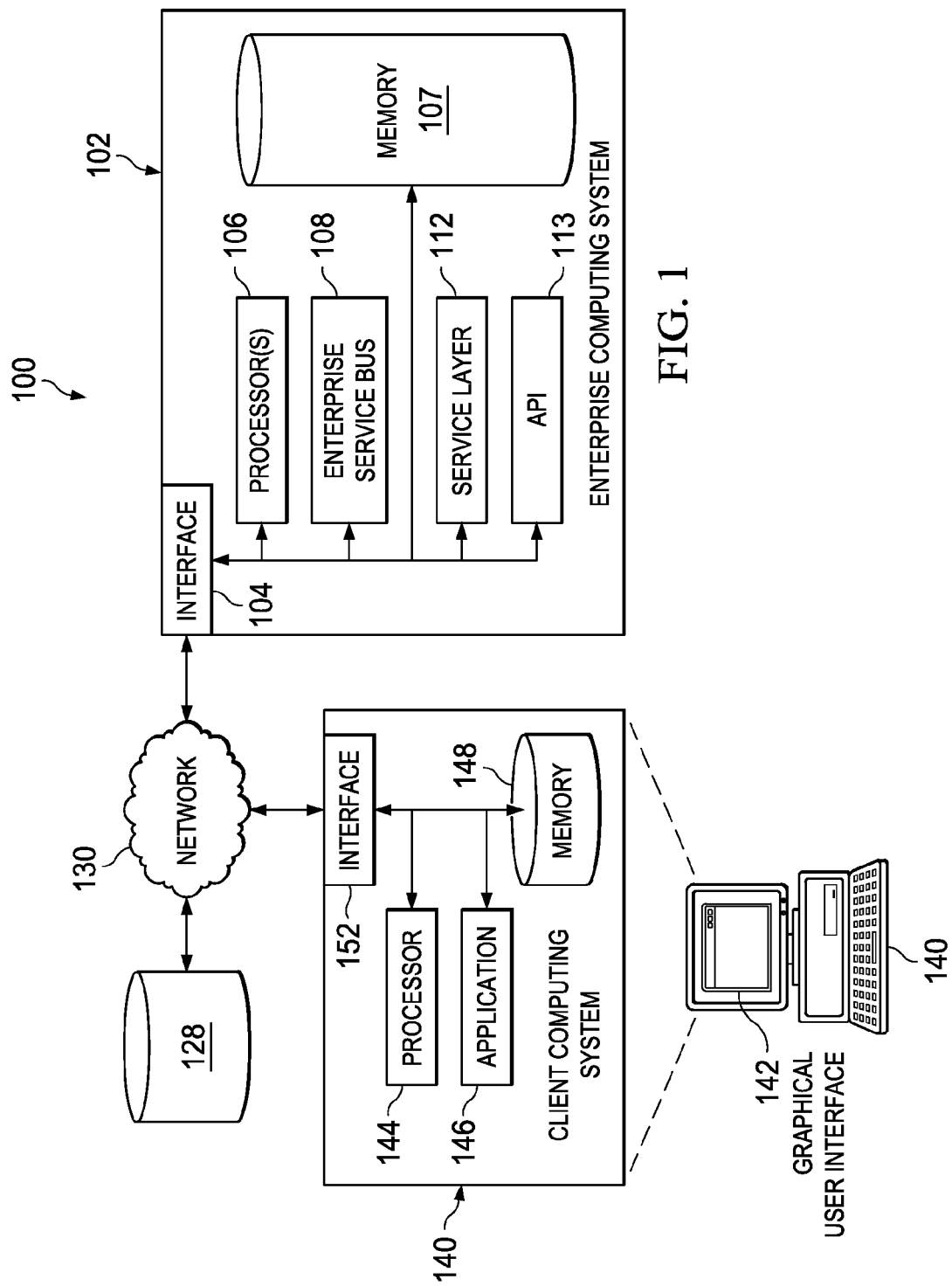
FIG. 1 illustrates an example distributed computing system for providing an error log.

FIG. 1 illustrates an example distributed computing system 100 for providing an error log. In some implementations, a connection is established by a hub computing system with a back-end computing system. The back-end computing system executes a first computer-implemented programming language. A request is received at the hub computing system for an error log from an Open Data Protocol (OData) application that resides on a mobile communications device. The mobile communications device executes a second computer-implemented programming language different than the first computer-implemented programming language. The error log includes error log entries associated with a runtime processing of a data model. The error is registered on the hub computing system as an OData service configured to be provided over an OData channel between the hub computing system and the mobile communications device. The error log is provided by the hub computing system to the OData application as the OData service over the OData channel.

In some examples, the illustrated enterprise server computing system 102 may store a plurality of various hosted applications, while in some examples, the enterprise server computing system 102 may be a dedicated server meant to store and execute only a single hosted application. In some instances, the enterprise server computing system 102 may comprise a web server, where the hosted applications represent one or more web-based applications accessed and executed via the network 130 by the client computing system 140 to perform the programmed tasks or operations of the hosted application.

At a high level, the illustrated enterprise server computing system 102 comprises an electronic computing device operable to receive, transmit, process, store, or manage data and information associated with the distributed computing system 100. Specifically, the enterprise server computing system 102 illustrated in FIG. 1 is responsible for receiving application requests from one or more client applications associated with the client computing system 140 of the distributed computing system 100 and responding to the received requests by processing said requests in the associated hosted application, and sending the appropriate response from the hosted application back to the requesting client application. In addition to requests from the client computing system 140 illustrated in FIG. 1, requests associated with the hosted applications may also be sent from internal users, external or third-party customers, other automated applications, as well as any other appropriate entities, individuals, systems, or computers.

As used in the present disclosure, the term "computer" is intended to encompass any suitable processing device. For example, although FIG. 1 illustrates a single enterprise server computing system 102, the distributed computing system 100 can be implemented using two or more servers, as well as computers other than servers, including a server pool. In some examples, the enterprise server computing system 102 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, the enterprise server computing system 102 may be adapted to execute any operating system, including Linux, UNIX, Windows, Mac OS, or any other suitable operating system.

The illustrated enterprise server computing system 102 further includes an interface 104. Although illustrated as a single interface 104 in FIG. 1, two or more interfaces 104 may be used according to particular needs, desires, or particular implementations of the example distributed computing system 100. The interface 104 is used by the enterprise server computing system 102 for communicating with other systems in a distributed environment—including within the example distributed computing system 100—connected to the network 130; for example, the client computing system 140 as well as other systems communicably coupled to the network 130 (not illustrated). Generally, the interface 104 comprises logic encoded in software and/or hardware in a suitable combination and operable to communicate with the network 130. More specifically, the interface 104 may comprise software supporting one or more communication protocols associated with communications such that the network 130 or interface's hardware is operable to communicate physical signals within and outside of the illustrated example distributed computing system 100.

Regardless of the particular implementation, "software" may include computer-readable instructions, firmware, wired or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java, Visual Basic, ABAP, assembler, Perl, any suitable version of 4GL, as well as others. While portions of the software illustrated in FIG. 1 are shown as individual modules that implement the various features and functionality through various objects, methods, or other processes, the software may instead include a number of sub-modules, third party services, components, libraries, and such, as appropriate. Conversely, the features and functionality of various components can be combined into single components as appropriate.

The illustrated enterprise server computing system 102 further includes a processor 106. Although illustrated as a single processor 106 in FIG. 1, two or more processors may be used according to particular needs, desires, or particular implementations of the example distributed computing system 100. The processor 106 may be a central processing unit (CPU), a blade, an application specific integrated circuit (ASIC), a field-programmable gate array (FPGA), or another suitable component. Generally, the processor 106 executes instructions and manipulates data to perform the operations of the enterprise server computing system 102. Specifically, the processor 106 executes the functionality required to receive and respond to requests from the client computing system 140.

The illustrated enterprise server computing system 102 also includes a memory 107. Although illustrated as a single memory 107 in FIG. 1, two or more memories may be used according to particular needs, desires, or particular implementations of the example distributed computing system 100. While memory 107 is illustrated as an integral component of the enterprise server computing system 102, in some implementations, the memory 107 can be external to the enterprise server computing system 102 and/or the example distributed computing system 100. The memory 107 may include any memory or database module and may take the form of volatile or non-volatile memory including, without limitation, magnetic media, optical media, random access memory (RAM), read-only memory (ROM), removable media, or any other suitable local or remote memory component. The memory 107 may store various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the enterprise computing system 102. Additionally, the memory 107 may include any other appropriate data, such as VPN applications, firmware logs and policies, firewall policies, a security or access log, print or other reporting files, as well as others.

The illustrated enterprise server computing system 102 further includes a service layer 112. The service layer 112 provides software services to the example distributed computing system 100. The functionality of the enterprise server computing system 102 may be accessible for all service consumers using this service layer. For example, in one implementation, the client computing system 140 can utilize the service layer 112 to communicate with the design engine 118. Software services provide reusable, defined business functionalities through a defined interface. For example, the interface may be software written in extensible markup language (XML) or other suitable language. While illustrated as an integrated component of the enterprise server computing system 102 in the example distributed computing system 100, alternative implementations may illustrate the service layer 112 as a stand-alone component in relation to other components of the example distributed computing system 100. Moreover, any or all parts of the service layer 112 may be implemented as child or sub-modules of another software module, enterprise application, or hardware module without departing from the scope of this disclosure.

The illustrated enterprise server computing system 102 further includes an application programming interface (API) 113. In some implementations, the API 113 can be used to interface between the design engine 118 and one or more components of the enterprise server computing system 102 or other components of the example distributed computing system 100, both hardware and software. For example, in some implementations, the design engine 118 can utilize the API 113 to communicate with the client computing system 140. The API 113 may include specifications for routines, data structures, and object classes. The API 113 may be either computer language independent or dependent and refer to a complete interface, a single function, or even a set of APIs. While illustrated as an integrated component of the enterprise server computing system 102 in the example distributed computing system 100, alternative implementations may illustrate the API 113 as a stand-alone component in relation to other components of the example distributed computing system 100. Moreover, any or all parts of the API 113 may be implemented as child or sub-modules of another software module, enterprise application, or hardware module without departing from the scope of this disclosure.

The client computing system 140 may be any computing device operable to connect to or communicate with at least the enterprise server computing system 102 using the network 130. In general, the client computing system 140 comprises a computer operable to receive, transmit, process, and store any appropriate data associated with the example distributed computing system 100. The illustrated client computing system 140 further includes an application 146. The application 146 is any type of application that allows the client computing system 140 to request and view content on the client computing system 140. In some implementations, the application 146 can be and/or include a web browser. In some implementations, the application 146 can use parameters, metadata, and other information received at launch to access a particular set of data from the enterprise server computing system 102. Once a particular application 146 is launched, a user may interactively process a task, event, or other information associated with the enterprise server computing system 102. Further, although illustrated as a single application 146, the application 146 may be implemented as multiple applications in the client computing system 140.

The illustrated client computing system 140 further includes an interface 152, a processor 144, and a memory 148. The interface 152 is used by the client computing system 140 for communicating with other systems in a distributed environment—including within the example distributed computing system 100—connected to the network 130; for example, the enterprise server computing system 102 as well as other systems communicably coupled to the network 130 (not illustrated). The interface 152 may also be consistent with the above-described interface 104 of the enterprise server computing system 102 or other interfaces within the example distributed computing system 100.

The processor 144 may be consistent with the above-described processor 106 of the enterprise server computing system 102 or other processors within the example distributed computing system 100. Specifically, the processor 144 executes instructions and manipulates data to perform the operations of the client computing system 140, including the functionality required to send requests to the enterprise server computing system 102 and to receive and process responses from the enterprise server computing system 102. The memory 148 may be consistent with the above-described memory 107 of the enterprise server computing system 102 or other memories within the example distributed computing system 100 but storing objects and/or data associated with the purposes of the client computing system 140.

Further, the illustrated client computing system 140 includes a GUI 142. The GUI 142 interfaces with at least a portion of the example distributed computing system 100 for any suitable purpose, including generating a visual representation of a web browser. In particular, the GUI 142 may be used to view and navigate various web pages located both internally and externally to the enterprise server computing system 102. Generally, through the GUI 142, an enterprise server computing system 102 user is provided with an efficient and user-friendly presentation of data provided by or communicated within the example distributed computing system 100.

There may be any number of client computing systems 140 associated with, or external to, the example distributed computing system 100. For example, while the illustrated example distributed computing system 100 includes one client computing system 140 communicably coupled to the enterprise server computing system 102 using network 130, alternative implementations of the example distributed computing system 100 may include any number of client computing systems 140 suitable for the purposes of the example distributed computing system 100. Additionally, there may also be one or more client computing systems 140 external to the illustrated portion of the example distributed computing system 100 that are capable of interacting with the example distributed computing system 100 using the network 130. Moreover, while the client computing system 140 is described in terms of being used by a single user, this disclosure contemplates that many users may use one computer, or that one user may use multiple computers.

The illustrated client computing system 140 is intended to encompass any computing device such as a desktop computer, laptop/notebook computer, wireless data port, smart phone, personal data assistant (PDA), tablet computing device, one or more processors within these devices, or any other suitable processing device. For example, the client computing system 140 may comprise a computer that includes an input device, such as a keypad, touch screen, or other device that can accept user information, and an output device that conveys information associated with the operation of the enterprise server computing system 102 or the client computing system 140 itself, including digital data, visual information, or a GUI 142, as shown with respect to the client computing system 140.

The illustrated distributed computing system 100 further includes a repository 128. In some implementations, the repository 128 is an in-memory repository. The repository 128 can be a cloud-based storage medium. For example, the repository 128 can be networked online storage where data is stored on virtualized pools of storage.

With respect to the network 130, generally, the illustrated network 130 facilitates wireless or wireline communications between the components of the distributed computing system 100 (i.e., between the computing systems 102 and 140), as well as with any other local or remote computer, such as additional clients, servers, or other devices communicably coupled to network 130 but not illustrated in FIG. 1. The network 130 is illustrated as a single network in FIG. 1, but may be a continuous or discontinuous network without departing from the scope of this disclosure, so long as at least a portion of the network 130 may facilitate communications between senders and recipients. The network 130 may be all or a portion of an enterprise or secured network, while in another instance at least a portion of the network 130 may represent a connection to the Internet.

In some instances, a portion of the network 130 may be a virtual private network (VPN), such as, for example, the connection between the client computing system 140 and the enterprise server computing system 102. Further, all or a portion of the network 130 can comprise either a wireline or wireless link. Example wireless links may include 802.11a/b/g/n, 802.20, WiMax, and/or any other appropriate wireless link. In other words, the network 130 encompasses any internal or external network, networks, sub-network, or combination thereof operable to facilitate communications between various computing components inside and outside the illustrated distributed computing system 100. The network 130 may communicate, for example, Internet Protocol (IP) packets, Frame Relay frames, Asynchronous Transfer Mode (ATM) cells, voice, video, data, and other suitable information between network addresses. The network 130 may also include one or more local area networks (LANs), radio access networks (RANs), metropolitan area networks (MANs), wide area networks (WANs), all or a portion of the Internet, and/or any other communication system or systems at one or more locations.

Figure 2:
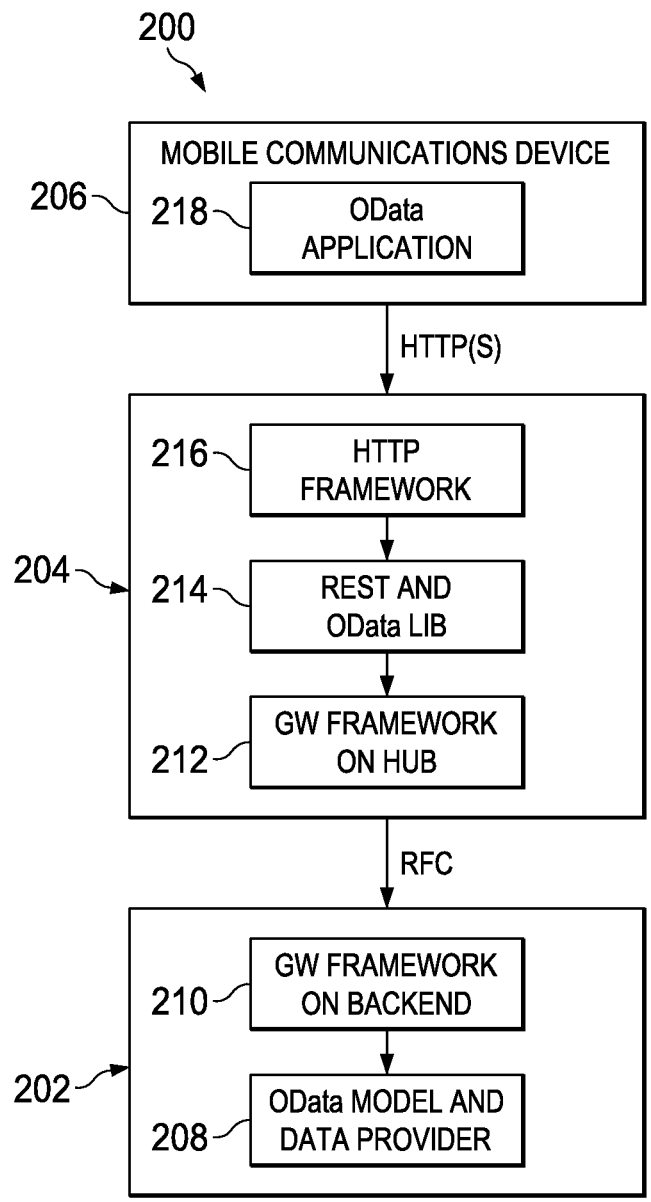
FIG. 2 illustrates a system for providing an error log.

FIG. 2 illustrates a system 200 for providing an error log. The system 200 includes a back-end computing system 202, a hub computing system 204, and a mobile communications device 206. For simplicity of illustration, the system 200 is shown including only a single mobile communications device 206. However, the system 200 can include any number of mobile communications devices. Additionally, the system 200 can be implemented by the enterprise computing system 102, the client computing system 140, or a combination thereof. For example, the back-end computing system 202 and the hub computing system 204 can be implemented by the enterprise computing system 102 and the mobile communications device 206 can be implemented by the client computing system 140.

In general, the back-end computing system 202 stores and provides an error log to the hub computing system 204. The error log includes error log entries associated with a runtime processing of a data model (e.g., a software module executing on the enterprise computing system 140). The back-end computing system 202 is in communication with the hub computing system 204 (e.g., over the network 130). The back-end computing system 202 includes an Open Data Protocol (OData) model and data provider 208 and a gateway framework module 210. In some examples, OData is a data access protocol designed to provide standard CRUD (create, read, update, and delete) access to a data source (e.g., the back-end computing system 202).

In general, the hub computing system 204 receives the error log and provides the error log as an OData service over an OData channel between the hub computing system 204 and the mobile communications device 206. The hub computing system 204 is in communication with the back-end computing system 202 and the mobile communications device 206. The hub computing system 204 includes a gateway framework module 212, a representational state transfer (REST) and OData library 214, and a hypertext transfer protocol (HTTP) framework module 216.

In general, the mobile communications device 206 receives the error log as an OData service over the OData channel between the mobile communication device 206 and the hub computing system 204. The mobile communications device 206 is in communication with the hub computing system 204. The mobile communications device 206 includes an OData application 218 (e.g., the OData application 218 resides on the mobile communications device 206). In some examples, the mobile communication system 206 is analogous to the client computing system 140. In some examples, the mobile communications device 206 includes a smartphone computing device, a tablet computing device, a phablet computing device, a personal digital assistant (PDA), or other mobile computing device operating a mobile operating system (e.g., an iOS-based, Android-based, Windows Mobile-based, BlackBerry, or Symbian-based mobile computing platform).

In some implementations, a connection is established by the hub computing system 204 with the back-end computing system 202. Specifically, the gateway framework module 212 of the hub computing system 202 issues a remote function call (RFC) to the back-end computing system 204, and particularly, to the gateway framework module 210 of the back-end computing system 204. In some examples, by issuing the RFC to the back-end computing system 204, the hub computing system 204 is able to communicate with the back-end computing system 204, including exchange of data between the hub computing system 204 and the back-end computing system 204.

Further, in some examples, the back-end computing system 202 executes a first computer-implemented programming language, such as a propriety programming language (or other high-level programming language). Additionally, in some examples, the hub computing system 204 executes a second computer-implemented programming language differing from the first computer-implemented programming language. For example, the second computer-implemented programming language can include one of the programming languages of PHP, ASP, Java, C, or C++. To that end, when the hub computing system 204 and the back-end computing system 202 execute differing computer-implemented programming languages, by issuing the RFC by the hub computing system 202 to the back-end computing system 204, the hub computing system 204 and the back-end computing system 204 are able to communication and exchange data.

In some examples, the hub computing system 204 establishes a connection with the back-end computing system 202 in response to a request for the error log from the mobile communications device 206.

In some implementations, in response to receiving the RFC from the hub computing system 204, the back-end computing system 202 retrieves an error log associated with a runtime processing of a data model. For example, the error log includes error log entries related to OData processing within the system 200, including errors associated with the OData application 218 (e.g., wrong data from the OData application 218) and/or errors in OData implementation (e.g., implementations in the back-end computing system 202).

In some examples, retrieving the error log includes accessing the error log from the OData model and data provider 208. For example, the OData model and data provider 208 can provide access to the error log. The error log can be stored in a repository (e.g., the repository 128) and the OData model and data provider 208 access the repository to provide the error log.

The hub computing system 204 receives a request for the error log from the OData application 218. Specifically, a user (e.g., a developer, administrator, support consultant, or end-user) associated with the mobile communications device 206 can initiate the request (e.g., using a graphical user interface (GUI)) for the error log utilizing the OData application 218. In response to the initiation of the request for the error log, the mobile communications device 206 provides the request to the hub computing system 204 over a network (e.g., the network 130) using a HTTP application protocol established between the hub computing system 204 and the mobile communications device 206. Specifically, the mobile communications device 206 provides the request for the error log to the HTTP framework module 216. The HTTP framework module 216 of the hub computing system 204 receives the request for the error log.

In some examples, the mobile communications device 206 executes a computer-implemented processing language different from the computer-implemented language that the back-end system 202 executes.

The hub computing system 204 registers the error log as an OData service that can be provided over an OData channel between the hub computing system 204 and the mobile communications device 206. Specifically, registering the error log received from the back-end computing system 202 can include converting a format of the error log such that the mobile communications device 206 and the OData application 218 are able to analyze and display data of the error log (e.g., on a GUI of the mobile communications device 206). For example, the REST and OData library 214 can convert the format of the error log (associated with the computer-implemented processing language of the back-end computing system 202) to a format that the mobile communications device 206 is able to utilize (e.g., an OData service). Specifically, the hub computing system 204, and particularly the REST and the OData library 214, register the error log as an OData service that the mobile communications device 206, and particularly, the OData application 218, can utilize such that the error log can be displayed by the mobile communications device 206 and analyzed (e.g., by a user of the mobile communications device 206).

To that end, by registering the error as an OData service, the OData service is provided over an OData channel that is established (or that is previously established) between the hub computing system 204 and the mobile communications device 206. Specifically, in some implementations, registering the error log as an OData service includes generating a model provider class and a data provider class that are each associated with the error log. For example, the OData model and data provider 208 generates the model provider class and the data provider class that are associated with the error log. Furthermore, the model provider class and the data provider class are registered (e.g., on the hub computing system 204) to provide the error log as the OData service. In some further implementations, a data object access (DAO) class is generated to provide an application programming (API) associated with the error log. For example, the back-end computing system 202 generates the DAO class to provide access to the error log such that the error log can be registered as an OData service.

The hub computing system 204 provides the error log to the OData application 218 as the OData service over the OData channel. Specifically, the hub computing system 204 provides (e.g., over the network 130) the error log that is accessed by from the back-end computing system 202 in the format of an OData service to the OData application 218 of the mobile communications device 206. In some examples, the error log is provided to the OData application 218 as the OData service through a web-based graphical user interface. For example, the error log as the OData service is formatted such that a web browser of the mobile communications device 206 is able to appropriately (graphically) render the error log such that the error log can be displayed by the mobile communications device 206 and analyzed (e.g., by a user of the mobile communications device 206). In some examples, the error log is formatted for display on a GUI of the mobile communication device 206. For example, the error log is formatted such that the GUI is able to appropriately display the error log based on the dimensions of the GUI (e.g., a screen size of the mobile communications device 206 that includes the GUI).

In some further implementations, the mobile communications device 206 is authorized to receive the error log as the OData service. Specifically, the mobile communications device 206 is registered by the hub computing system 204 as a registered (e.g., approved) system for receiving the error log as the OData service. For example, the mobile communication device 206 can include a third-party device, and thus, to maintain the security (e.g., integrity) of the error log (and the system 200), the mobile communications device 206 is registered with the hub computing system 204. Thus, only registered mobile communications devices can receive the error log as the OData service.

Figure 3A:
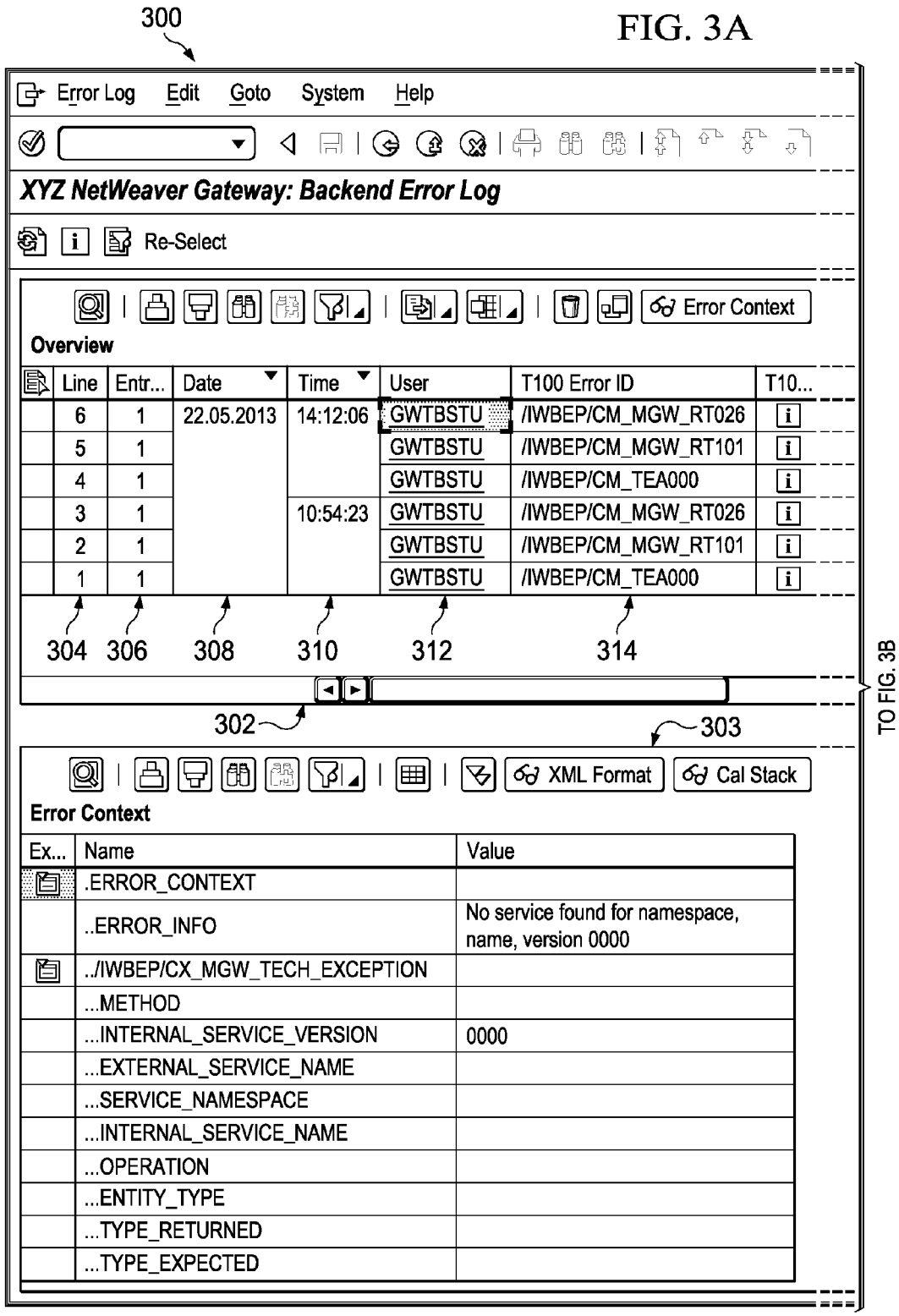
FIGS. 3A, 3B and 4 illustrate example graphical user interfaces for a display of an error log on a mobile communications device.
Figure 3B:
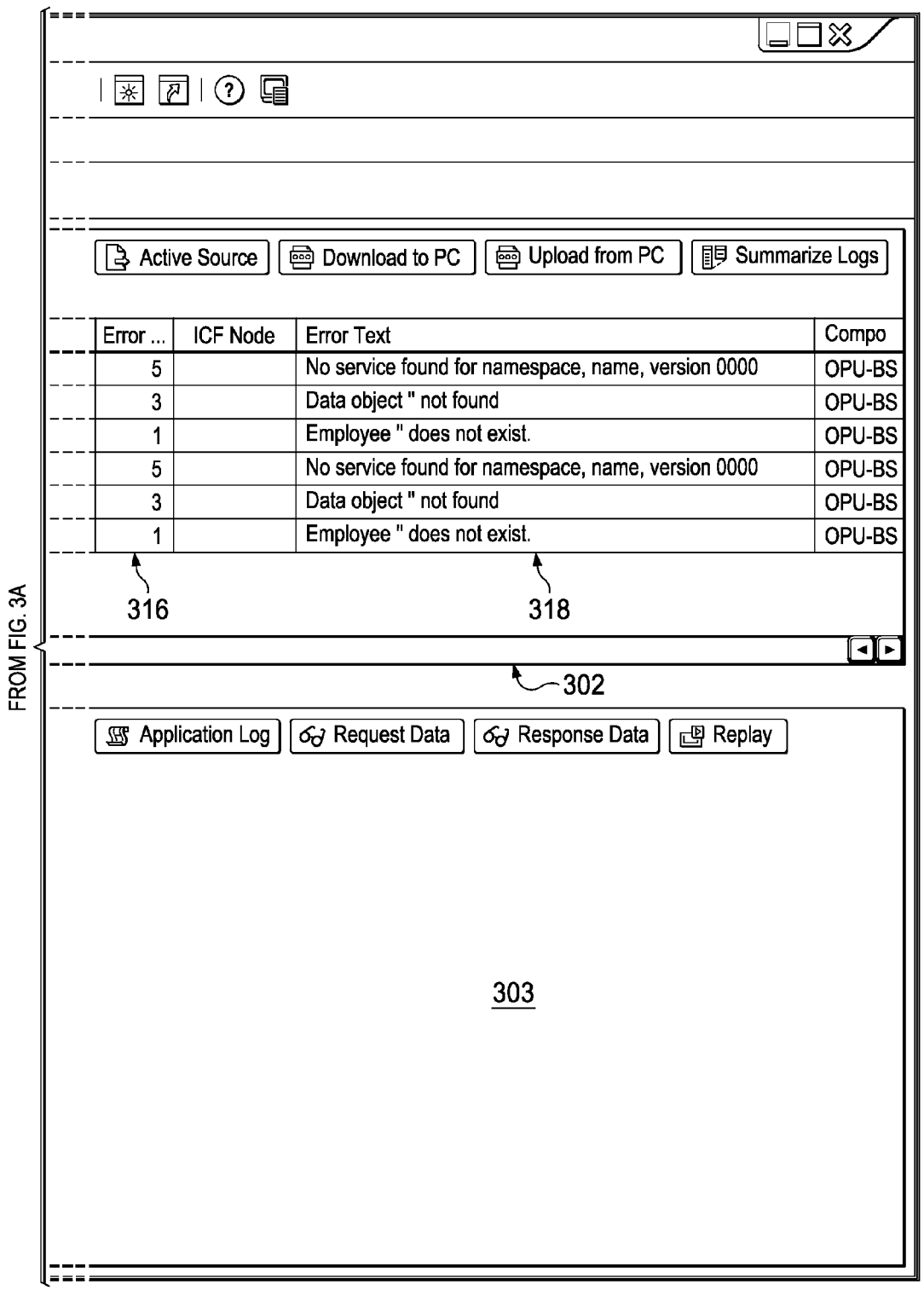

FIGS. 3A and 3B illustrates an example graphical user interface (GUI) 300 for a display of the error log on a mobile communications device (e.g., a tablet computing device). The GUI 300 includes a display of the error log associated with the runtime processing, and specifically, display of context information about the time and location of the errors of the error log. The display of the error log facilitates navigation to the affected source code where the user can make corrections. Specifically, the error log enables the user to 1) identify precise time and location of errors in source code; 2) determine how often an error has occurred; 3) perform route-cause analysis; and 4) reproduce and correct errors.

The GUI 300 includes an overview portion 302 of the error log and an error context portion 303 of the error log. The overview portion 302 lists errors, including a line field 304, an entry field 306, a date field 308, a time field 310, a user field 312, an error ID field 314, an error count field 316, and an error text field 318. Specifically, for each error, the line field 304 and the entry field 306 include information about where the error occurred (e.g., in source code); the date field 308 and the time field 310 include information about when the error occurred; the user field 312 includes information about what user is associated with the error (or the user currently viewing the error log); the error ID field 314 includes information about the identification (ID) number associated with the error; the error count field 316 includes information associated with a number of occurrences of the error; and the error text field 318 includes text-information associated with the error. In some examples, the error count field 316 facilitates a reduction in the amount of data stored in the error log as it counts the number of times of an identical error (according to standard parameters including user name, service name, message class, and message number) within a given time period (e.g., one hour).

When a particular error is selected from the error log (of the overview portion 302), the error context portion 303 displays detailed context information about the particular error. In some examples, the context information can be expanded or collapsed based on the desired level of detail (e.g., the level of detail the user desires). The context information is organized accordingly to name and value.

Figure 4:
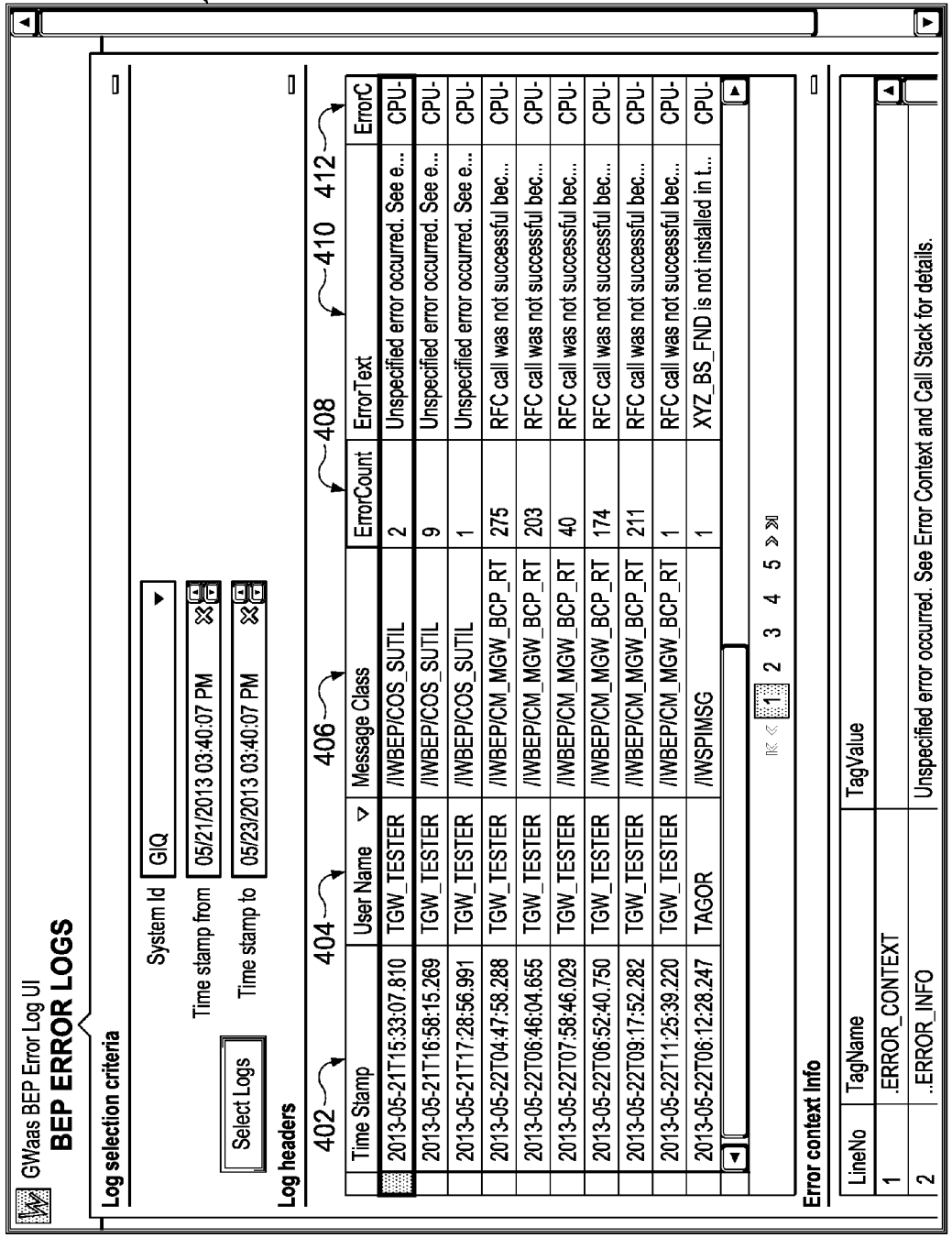

FIG. 4 illustrates an example graphical user interface (GUI) 400 for display of the error log on a mobile communications device (e.g., a tablet computing device). The GUI 400 includes a display of the error log as represented on a web-based graphical user interface. The GUI 400 includes a time stamp field 402, a user name field 404, a message class field 406, an error count field 408, an error text field 410, and an error component field 412. The error log can further include such information via the web-based graphical user interface such as user name, namespace, service name, message ID, message number, component, package, remote address, request URI part, request ID (ID from mobile communications device 206), operation ID (indenter within the error log), and transaction ID (identifies one transaction within the system, e.g., system 200).

Figures 1, 5A:
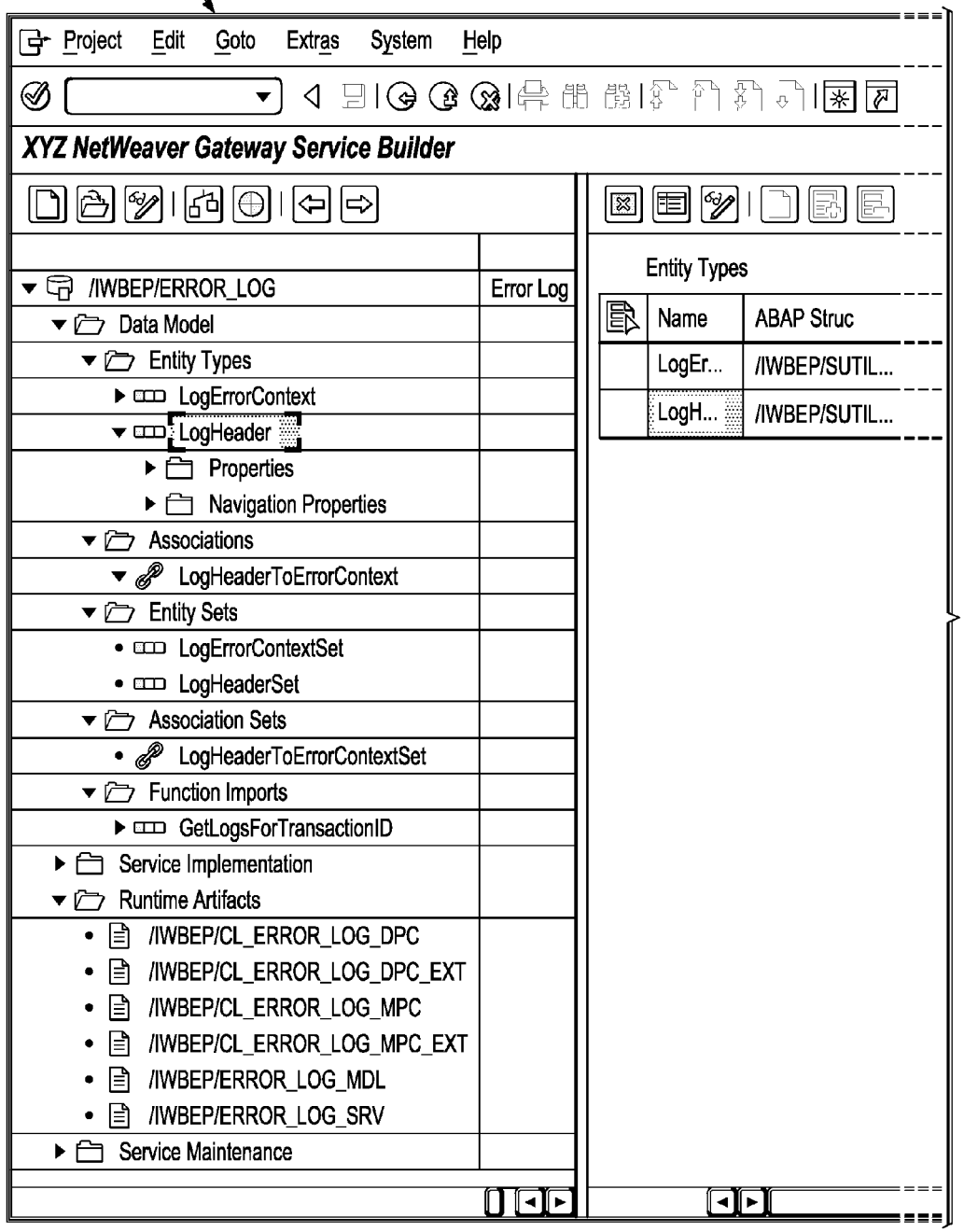
Figures 2, 5A:
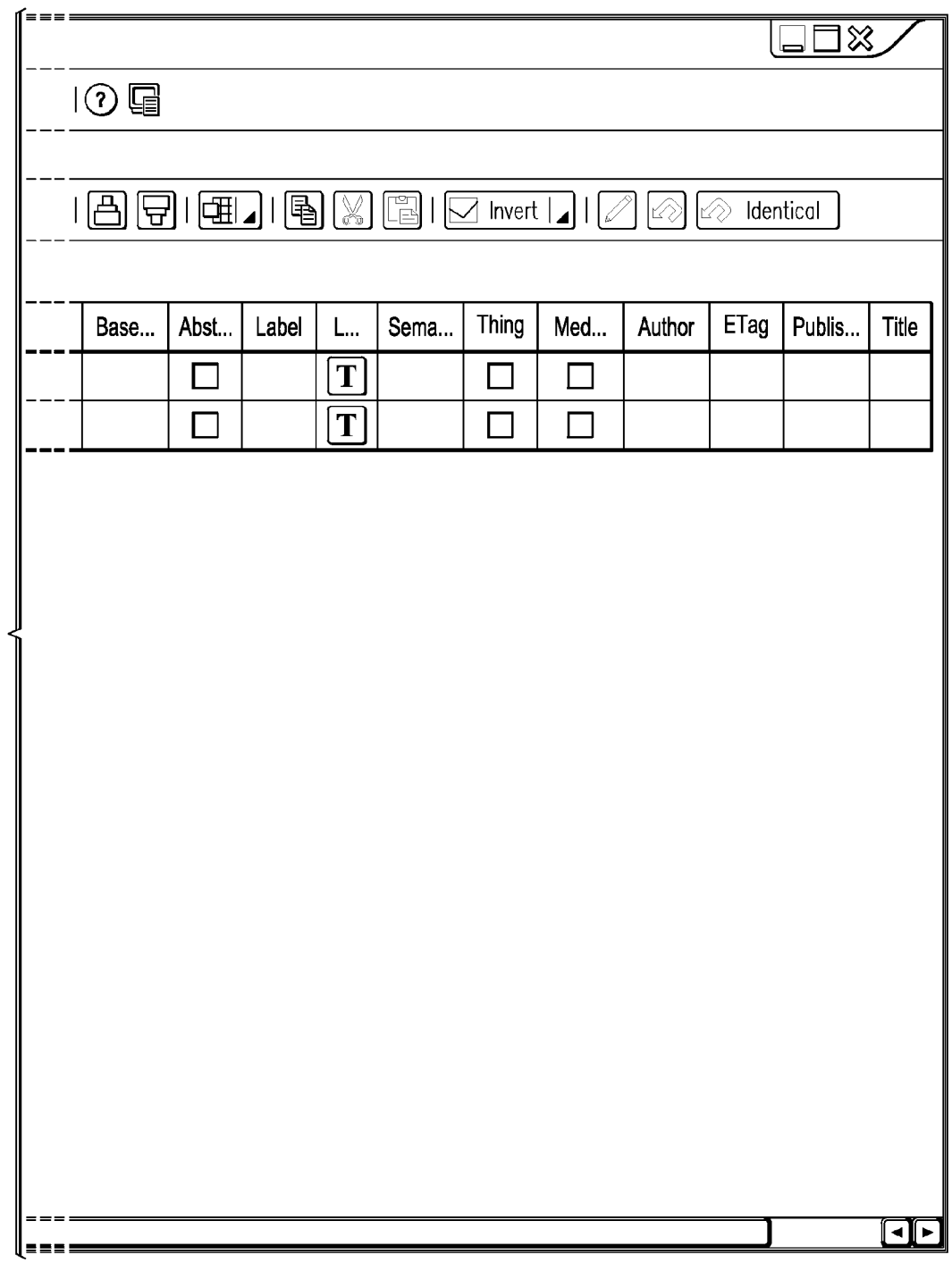
Figures 1, 5B:
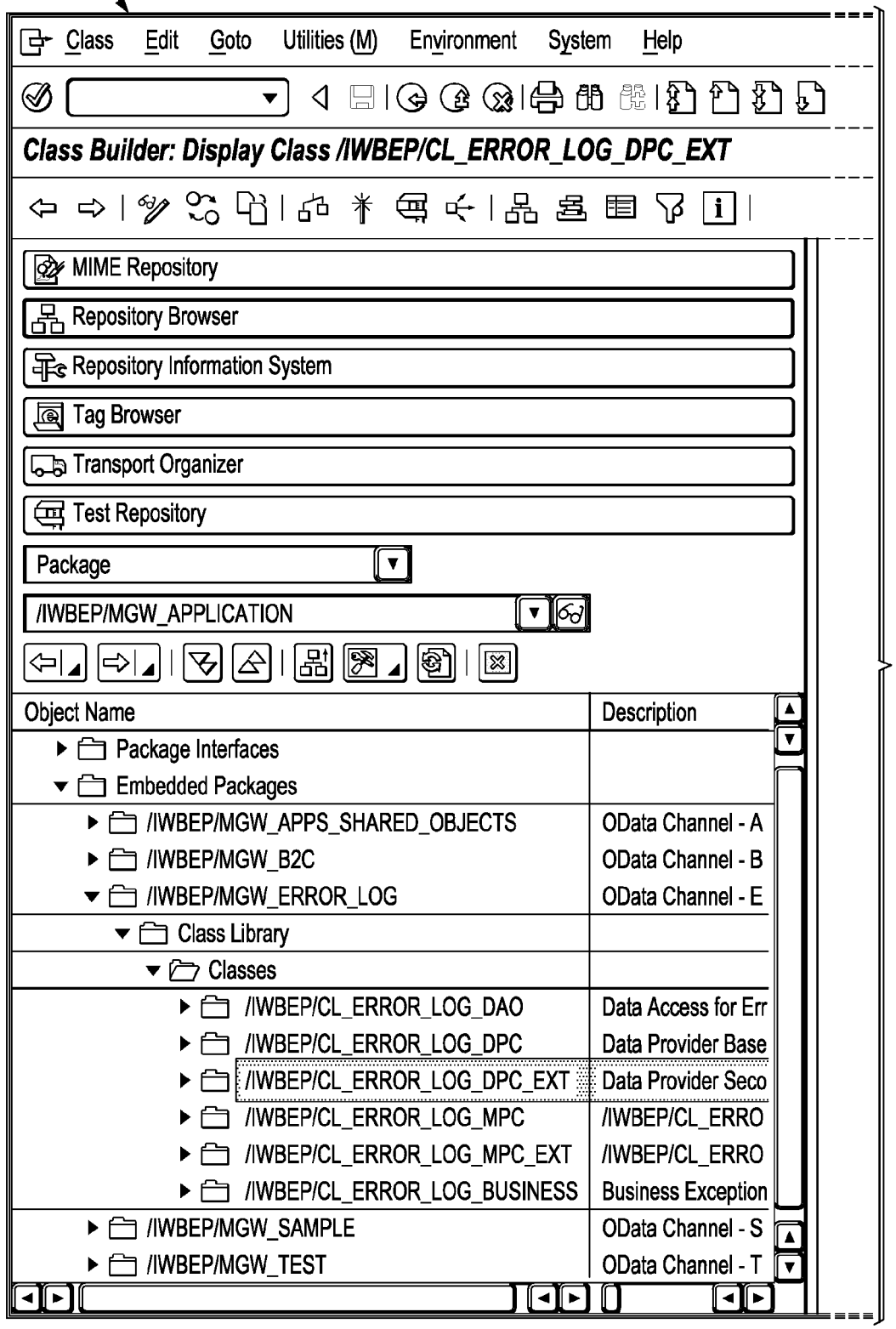
Figures 2, 5B:
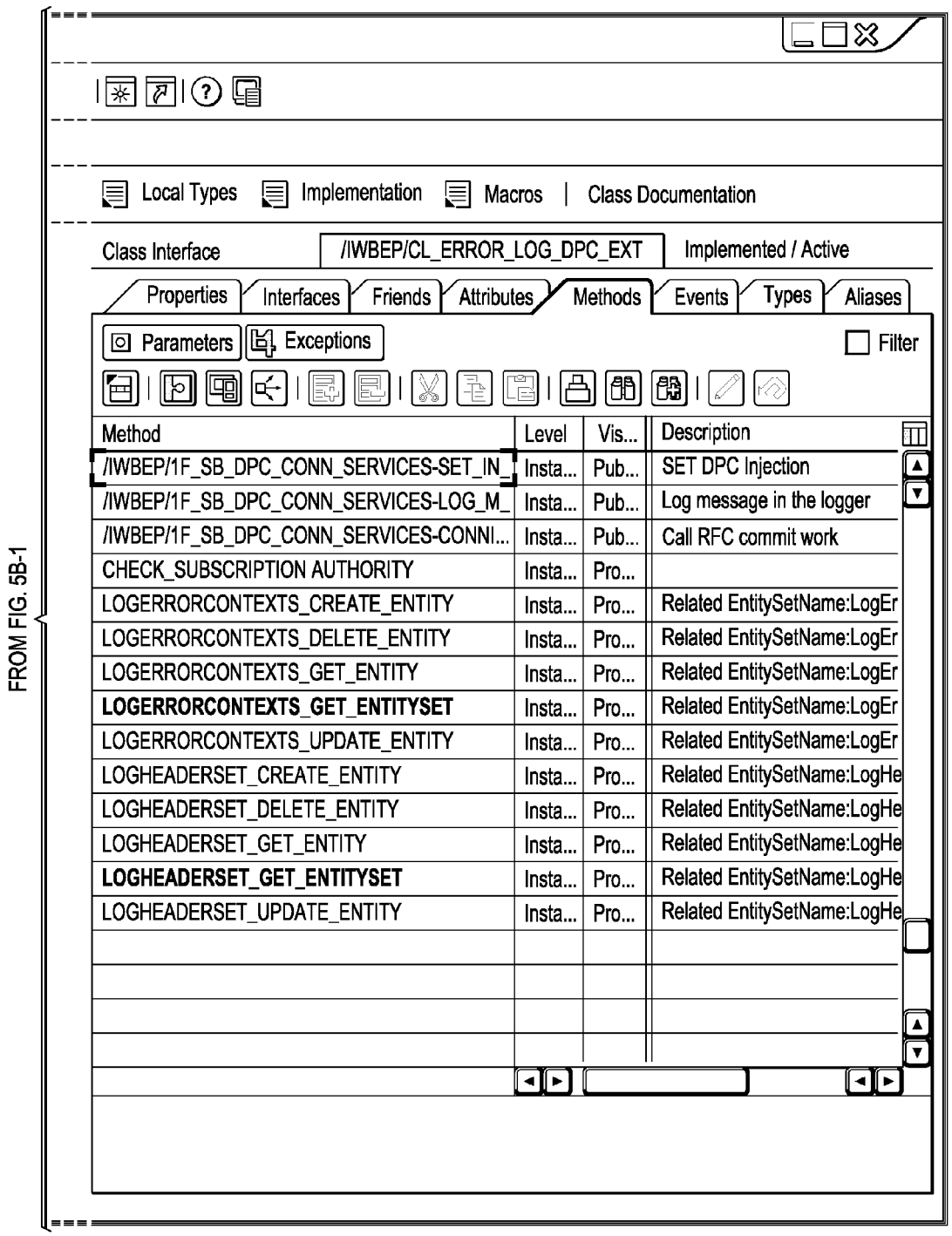
Figure 5C:
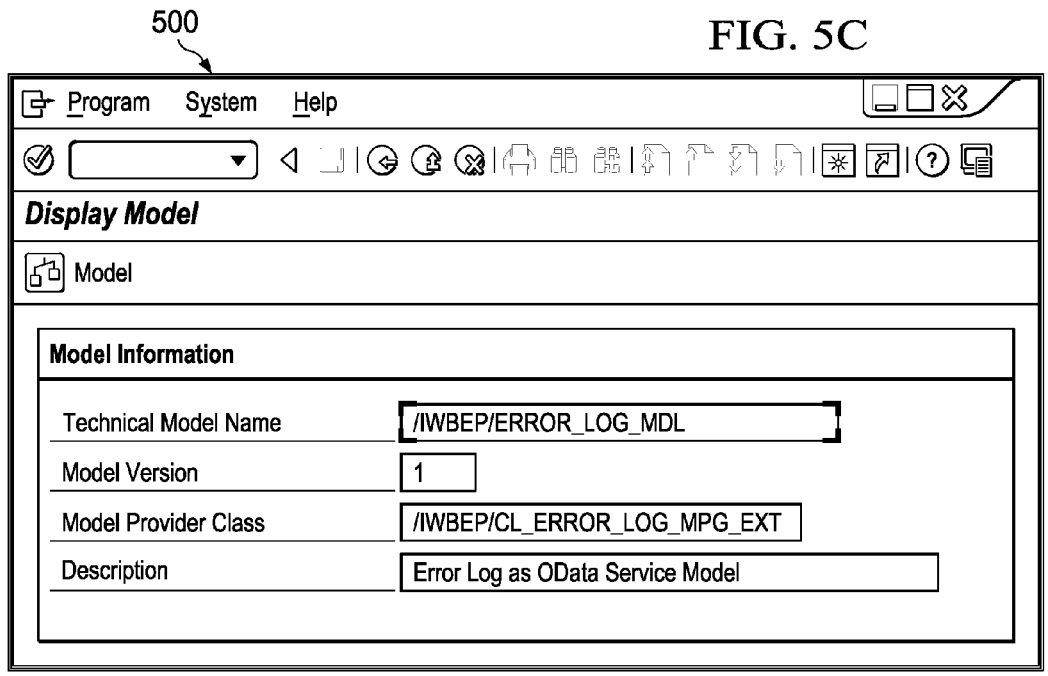
Figure 5E:
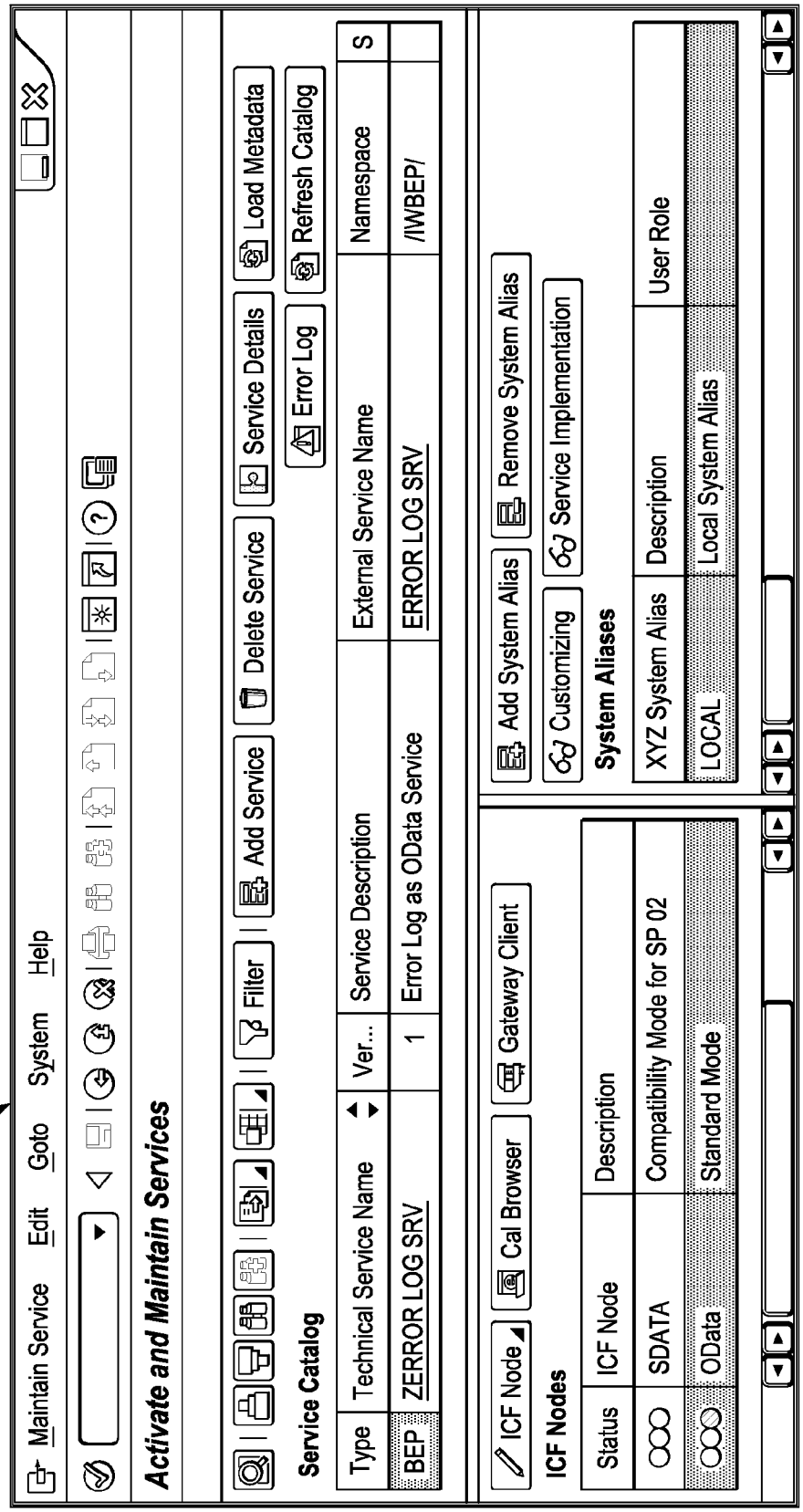

FIGS. 5A-5E show an example GUI 500 for the implementation of the error log as the OData service. FIGS. 5A-1 and 5A-2 illustrate generation of the model provider and data provider classes (generated though a service builder tool). FIGS. 5B-1 and 5B-2 illustrates implementation of the model provider and the data provider classes. FIGS. 5C and 5D illustrate registration of the back-end model and service. FIG. 5E illustrates registration of the OData service on the hub computing system (e.g., the hub computing system 204).

Figure 6:
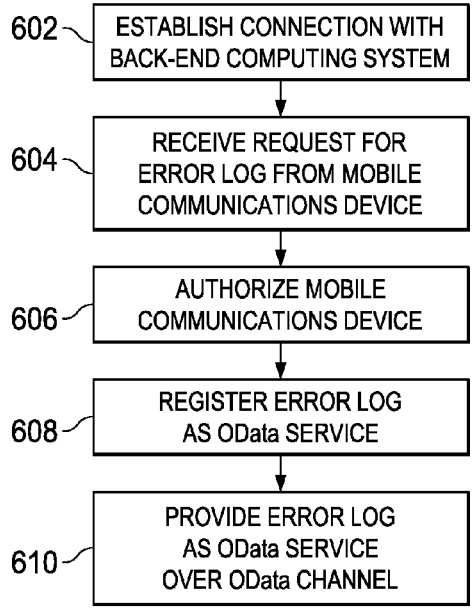
FIG. 6 is a flow chart that illustrates a method for providing an error log.

FIG. 6 is a flow chart that illustrates a method 600 for providing an error log. For clarity of presentation, the description that follows generally describes method 600 in the context of FIGS. 1 and 2. For example, as illustrated, particular steps of the method 600 may be performed on or at an enterprise system, cloud-based system, and/or on-demand system, while other particular steps may be performed on or at a client system or on-premise system. However, method 600 may be performed, for example, by any other suitable system, environment, software, and hardware, or a combination of systems, environments, software, and hardware as appropriate.

In step 602, a hub computing system establishes a connection with a back-end computing system. The back-end computing system executes a first computer-implemented programming language. For example, a connection is established by the hub computing system 204 with the back-end computing system 202. Specifically, the gateway framework module 212 of the hub computing system 202 issues a remote function call (RFC) to the back-end computing system 204, and particularly, to the gateway framework module 210 of the back-end computing system 204.

In step 604, at the hub computing system, a request is received for the error log from an OData application that resides on a mobile communications device. The mobile communications device executes a second computer-implemented programming language different than the first computer-implemented programming language (of the back-end computing system). The error log including error log entries associated with a runtime processing of a data model. For example, the hub computing system 204 receives a request for the error log from the OData application 218. Specifically, a user (e.g., a developer, administrator, support consultant, or end user) associated with the mobile communications device 206 can initiate the request (e.g., using a graphical user interface (GUI)) for the error log utilizing the OData application 218. In some examples, the second computer-implemented programming language of the mobile communications device 206 includes an iOS-based or Android-based programming language.

In step 606, the mobile communications device is authorized to receive the error log. For example, the mobile communications device 206 is authorized to receive the error log as the OData service. Specifically, the mobile communications device 206 is registered by the hub computing system 204 as a registered (e.g., approved) system for receiving the error log as the OData service.

In step 608, the error log is registered on the hub computing system as an OData service that can be provided over an OData channel between the hub computing system and the mobile communications device. For example, the hub computing system 204 registers the error log as an OData service that can be provided over an OData channel between the hub computing system 204 and the mobile communications device 206. Specifically, registering the error log received from the back-end system 202 can include converting a format of the error log such that the mobile communications device 206 and the OData application 218 are able to analyze and display data of the error log (e.g., on a GUI of the mobile communications device 206).

In step 610, the error log is provided by the hub computing system to the OData application as the OData service over the OData channel. The hub computing system 204 provides the error log to the OData application 218 as the OData service over the OData channel. Specifically, the hub computing system 204 provides (e.g., over the network 130) the error log that is accessed by from the back-end computing system 202 in the format of an OData service to the OData application 218 of the mobile communications device 206. In some examples, the error log is provided to the OData application 218 as the OData service through a web-based graphical user interface. In some examples, the error log is formatted for display on a GUI of the mobile communication device 206.

Figure 7:
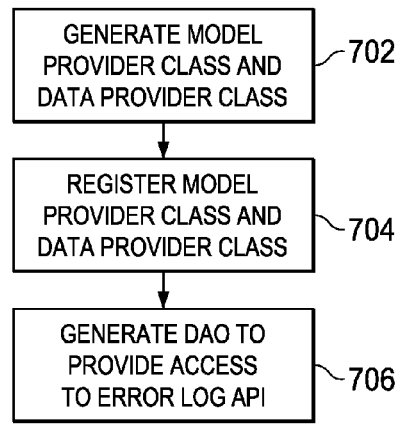
FIG. 7 is a flow chart that illustrates a method 700 for registering an error log as an OData service.

FIG. 7 is a flow chart that illustrates a method 700 for registering the error log as an OData service. For clarity of presentation, the description that follows generally describes method 700 in the context of FIGS. 1 and 2. For example, as illustrated, particular steps of the method 700 may be performed on or at an enterprise system, cloud-based system, and/or on-demand system, while other particular steps may be performed on or at a client system or on-premise system. However, method 600 may be performed, for example, by any other suitable system, environment, software, and hardware, or a combination of systems, environments, software, and hardware as appropriate.

In step 702, a model provider class and a data provider class are registered that are each associated with the error log. For example, the OData model and data provider 208 generate the model provider class and the data provider class that are associated with the error log. In step 704, the model provider class and the data provider class are registered to provide the error log as the OData service. In step 706, a data object access (DAO) class is generated to provide access to an application programming interface (API) associated with the error log For example, the back-end computing system 202 generates the DAO class such to provide access to the error log such that the error log can be registered as an OData service.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example Linux, UNIX, Windows, Mac OS, Android, iOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a central processing unit (CPU), a FPGA (field programmable gate array), or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), or plasma monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN), a wide area network (WAN), e.g., the Internet, and a wireless local area network (WLAN).

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order (e.g., FIGS. 6 and 7), this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results. Accordingly, the above description of example implementations does not define or constrain this disclosure. Other changes, substitutions, and alterations are also possible without departing from the spirit and scope of this disclosure.

What is claimed is:

1. A computer-implemented method of providing an error log, comprising:
   establishing, by a hub computing system, a connection with a back-end computing system, the back-end computing system executing a first computer-implemented programming language;
   receiving, at the hub computing system, a request for an error log from an Open Data Protocol (OData) application that resides on a mobile communications device, the mobile communications device executing a second computer-implemented programming language different than the first computer-implemented programming language, and the error log including error log entries associated with a runtime processing of a data model;
   registering, on the hub computing system, the error log as an OData service configured to be provided over an OData channel between the hub computing system and the mobile communications device; and
   providing, by the hub computing system, the error log to the OData application as the OData service over the OData channel.

2. The computer-implemented method of claim 1, wherein providing the error log to the OData application comprises providing the error log though a web-based graphical user interface.

3. The computer-implemented method of claim 1, further comprising authorizing the mobile communications device to receive the error log.

4. The computer-implemented method of claim 1, wherein providing the error log to the OData application further comprises formatting the error log for display on a graphical user interface of the mobile communications device.

5. The computer-implemented method of claim 1, wherein registering the error log as an OData service comprises:
   generating a model provider class and a data provider class that are each associated with the error log; and
   registering the model provider class and the data provider class to provide the error log as the OData service.

6. The computer-implemented method of claim 5, further comprising:
   generating a data object access class; and
   based on the generated data object access class, providing access to an application programming interface (API) associated with the error log.

7. A non-transitory computer storage medium encoded with a computer program, the program comprising instructions that when executed by one or more computers cause the one or more computers to perform operations comprising:
   establishing, by a hub computing system, a connection with a back-end computing system, the back-end computing system executing a first computer-implemented programming language;
   receiving, at the hub computing system, a request for an error log from an Open Data Protocol (OData) application that resides on a mobile communications device, the mobile communications device executing a second computer-implemented programming language different than the first computer-implemented programming language, and the error log including error log entries associated with a runtime processing of a data model;
   registering, on the hub computing system, the error log as an OData service configured to be provided over an OData channel between the hub computing system and the mobile communications device; and
   providing, by the hub computing system, the error log to the OData application as the OData service over the OData channel.

8. The non-transitory computer storage medium of claim 7, wherein providing the error log to the OData application comprises providing the error log though a web-based graphical user interface.

9. The non-transitory computer storage medium of claim 7, the operations further comprising authorizing the mobile communications device to receive the error log.

10. The non-transitory computer storage medium of claim 7, wherein providing the error log to the OData application further comprises formatting the error log for display on a graphical user interface of the mobile communications device.

11. The non-transitory computer storage medium of claim 7, wherein registering the error log as an OData service comprises:
   generating a model provider class and a data provider class that are each associated with the error log; and registering the model provider class and the data provider class to provide the error log as the OData service.

12. The non-transitory computer storage medium of claim 11, the operations further comprising:
generating a data object access class; and
based on the generated data object access class, providing access to an application programming interface (API) associated with the error log.

13. A system of one or more hardware computing devices, the one or more hardware computing devices configured to perform operations comprising:
establishing, by a hub computing system, a connection with a back-end computing system, the back-end computing system executing a first computer-implemented programming language;
receiving, at the hub computing system, a request for an error log from an Open Data Protocol (OData) application that resides on a mobile communications device, the mobile communications device executing a second computer-implemented programming language different than the first computer-implemented programming language, and the error log including error log entries associated with a runtime processing of a data model;
registering, on the hub computing system, the error log as an OData service configured to be provided over an OData channel between the hub computing system and the mobile communications device; and
providing, by the hub computing system, the error log to the OData application as the OData service over the OData channel.

14. The system of claim 13, wherein providing the error log to the OData application comprises providing the error log though a web-based graphical user interface.

15. The system of claim 13, the operations further comprising authorizing the mobile communications device to receive the error log.

16. The system of claim 13, wherein providing the error log to the OData application further comprises formatting the error log for display on a graphical user interface of the mobile communications device.

17. The system of claim 13, wherein registering the error log as an OData service comprises: generating a model provider class and a data provider class that are each associated with the error log; and
registering the model provider class and the data provider class to provide the error log as the OData service.

* * * * *